United States Patent Office 2,906,064
Patented Sept. 29, 1959

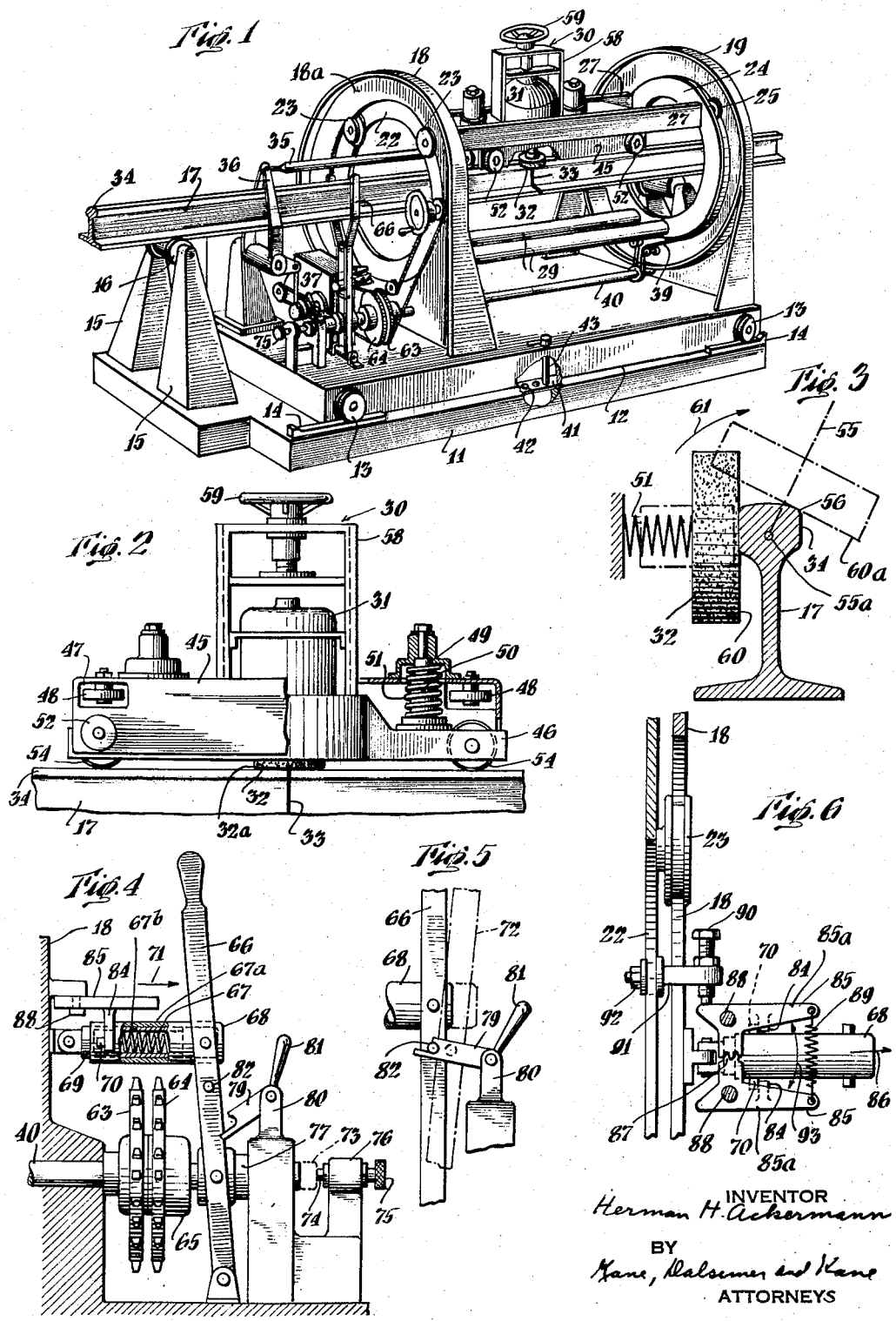

2,906,064

RAIL HEAD GRINDING MECHANISM

Herman H. Ackermann, Chicago, Ill., assignor to Railtrack Equipment Corporation, S.A., a corporation of the Republic of Panama Application May 5, 1955, Serial No. 506,227

8 Claims. (Cl. 51—54)

The process of connecting rails together by welding is becoming increasingly common. More particularly the electric welding of rail segments extending over several miles, although effected quite readily, necessitates the removal of the protruding weld seam joining the rail segments together. Consequently, this invention pertains in general to a mechanism for grinding rails and more particularly to a mechanism for removing the weld seam from or around the juncture of two welded segments of rail.

It is necessary to remove the weld seam from the juncture and especially at least at that portion encompassing the rail heads, so that a train or other vehicle riding thereon is not jolted by the bump of the weld protruding around the seam, which bump usually extends downward and beyond the plane of the top of the rail head. It may or may not be desirable to remove the protruding weld from that portion of the welded rail segments other than the head, as seams on other portions of the rail segment juncture may not ordinarily affect smooth passage of a vehicle thereover.

Briefly, the machine which forms the subject matter of this invention comprises a mobile unit having grinding means arranged to cooperate with feeler means passing longitudinally over the rail sections in the immediate vicinity and on either side of the weld. The feeler means cooperates with the grinding means to guide the grinding means in a path conformable to that being taken by the feeler means. Thus, as the grinding means is forced to copy the path of the feeler means as the feeler means moves along a section of unbroken rail, the grinding means will level a weld protuberance or other irregularity in the rail surface it traverses. An automatic stop mechanism arrests the motion of the grinding wheel when it has passed over the entire rail head weld surface.

It is an object of this invention to provide a mechanism which will remove the weld seam at the junction of two welded sections of rail head.

It is another object of this invention to provide a portable mechanism for removing rail weld seams with the aid of a machine of simple construction and one capable of performing the operation automatically and in a short period of time.

It is a further object of this invention to provide mechanism for removing rail head and other juncture seams in which the means for removing the seam is guided by feeling means traversing a normal seamless stretch of rail.

It is a still further object of this invention to provide a mechanism for removing rail head and other juncture seams by which the seam may be removed from the top of the rail head and also from all other portions of the rail.

These and other objects and features as well as the advantages of this invention will become more apparent from the following detailed description, especially when taken together with the accompanying drawings, in which:

Fig. 1 is an over-all perspective view of apparatus embodying this invention;

Fig. 2 is a vertical, longitudinal elevation of the carriage portion of the apparatus with a portion of the frame broken away;

Fig. 3 is a detailed partially sectional and partially diagrammatic view showing the grinding of a rail head;

Fig. 4 is a side elevation, partly broken away, of the mechanical controls of the apparatus looking from behind the rail of Fig. 1;

Fig. 5 is an enlarged view of a portion of the controls of Fig. 4 in locked position; and Fig. 6 is a top plan view of the automatic terminal release mechanism of Fig. 4.

Referring now to Fig. 1, the rail head grinding mechanism comprises a fixed base 11 and a bed member 12 capable of moving along strips 14 by means of rollers 13. The movement of bed member 12 is desired for purposes of alignment only, which will be described later, and thus the amount of such movement along strips 14 need be very small. All operable portions of the rail grinding mechanism are supported by the bed member 12 except pedestals 15 which support spool-type rollers 16 on which the rail 17 to be ground rests and travels.

Rail 17 passes through two rings 18 and 19, which are axially aligned and spaced from each other and mounted on bed member 12. Within the ring 18 is mounted the disc 22 bearing three rollers 23, uniformly distributed on the circumference of disc 22 and adapted to ride on the inner edge of ring 18. Ring 19 is likewise provided with a rotatively mounted disc 24 carrying similar rollers 25. These discs are connected by longitudinal guideways 27 and also two heavy bars 29 which latter serve as counter-weights for a carriage generally indicated at 30, which travels between and along guideways 27.

Carriage 30 bears a motor 31 for driving the grinding wheel 32. Grinding wheel 32 is used to grind weld seam 33 of rail 17.

The carriage 30 can travel back and forth over weld seam 33 while grinding wheel 32 can be so inclined as to grind the weld off the rail head 34, Fig. 3, along its entire cross-section contour. For the purpose of moving carriage 30 back and forth across weld seam 33 there is provided a connecting rod 35 which is reciprocated by means of levers 36 which preferably straddle rail 17. The operating motor (not shown) for levers 36 is located in the box 37 resting on the bed member 12. To effect the movement of the carriage 30 circumferentially about the surface of rail head 34, chain 39 driven by shaft 40 encompasses the circumference of the disc 24, with a similar drive being desirably coupled to disc 22. This allows these discs to be rotated within the rings 18 and 19, in cooperation with their respective rollers 23 and 25.

In order to allow grinding wheel 32 to successfully operate on weld seam 33 over the entire periphery of rail head 34 a rotation of about 180°, at most, will be necessary. In addition to mechanism causing levers 36 to operate, box 37 contains a power drive for rotating shaft 40. The reciprocating and rotating means within box 37 may be of conventional character such as would occur to anyone skilled in the art of mechanics. Arrest of rotation of the discs at each end of the grinding area is accomplished automatically; one illustration of a mechanism which accomplishes such a function will be described below.

Through a broken away portion of base 11 and bed member 12 (Fig. 1), a retaining device to fix the slidable relationship of the two members is shown. For the purposes of illustration the retaining device is shown as a perforated member 41 secured to the base 11 and provided with holes 42 to receive a pin 43. This retaining device makes it possible to bring grinding wheel 32 approximately over the weld seam 33 in rail 17 by shifting and locking bed member 12 before any longitudinal displacement of the carriage 30 has been effected. Pedestals 15 are preferably adjustable in height since rails of various height are to be processed. Then, too, grinding wheel 32 may be brought into contact with the weld seam 33 before any movement of the carriage 30 by rotation of the discs 22 and 24 has been initiated.

The structure of the carriage is best seen in Fig. 2. It comprises two frames 45 and 46, one inside the other. Outer frame 45 has recesses 47 in which are mounted rollers 48 which laterally contact the guideways 27 as the carriage moves longitudinally with respect to the rail. Rollers 52 run beneath guideways 27. The connection between the two frames 45 and 46 is provided by telescoping parts 49 and 50 while springs 51 around the telescoping parts tend to thrust frame 46 downward relative to frame 45 or, as shown in Fig. 1, toward rail head 34.

Frame 46 bears motor 31 of grinding wheel 32, and two feeler or follower rollers 54 located in alignment in the plane of the carriage 30 through the center line of the grinding wheel 32. This center line, however, is somewhat inclined so that the grinding wheel 32 will operate on rail head 34 with its edge at 32a. Both motor 31 and grinding wheel 32 are movably supported in a frame 58 which may be finely adjusted by means of a hand wheel 59 fixed to carriage 30 whereby the grinding wheel 32 can be moved perpendicularly to the rail surface being ground.

In the operation of the mechanism described, the grinding wheel edge 60, Fig. 3, is brought into exact coincidence with the plane externally tangent to the two feeler rollers 54 to cause the wheel to roll over and smooth out any protuberance on the head of any rail seam. Grinding wheel 32 will itself exactly describe the contour of the rail head, as it follows the movement of feeler rollers 54. As rollers 48 and 52 engage guideways 27, feeler rollers 54 will rest against rail head 34 because of the pressure of springs 51. Thus carriage 30 rolls adjacent the guideways as it travels reciprocally and longitudinally along rail 17. With grinding wheel edge 60 following the same contour as the feeler rollers 54, the grinding wheel 32 will remove any roughness extending over the contour of the rail 17, in particular weld seam 33, and restore an even surface to rail head 34. This is because feeler rollers 54 are free from any obstructions and travel only along smooth portions of rail head 34.

Because of the slow rotational movement imparted to discs 22 and 24, by chains 39, Fig. 1, grinding wheel 32 will follow not merely an axially directed contour of rail 17 adjacent weld 33 but also its sectional contour, at least as regards rail head 34. Thus, feeler rollers 54 and grinding wheel 32 successively follow closely along all of the rail head's surface. This is illustrated schematically in Fig. 3 where grinding wheel 32 is shown in a position indicated by the solid lines as grinding one side of the rail head and in another position indicated by the broken lines as grinding a contour of the upper surface. The grinding wheel 32 moves in the direction indicated by arrow 61, guided in that direction by the rotation of discs 22 and 24 in rings 18 and 19.

Fig. 3 likewise diagrams the yielding effect of springs 51 guiding grinding wheel 32 and feeler wheels 54 over rail head 34. The motor or motors within housing 37 can simultaneously drive carriage 30 and accomplish the rotation of discs 22 and 24. Any simple expedient may be used to cause levers 36 to rock back and forth, such as the illustrated crank, connecting rod mechanism and cam.

In Fig. 4 a mechanical device is shown which may be used to control the rotation of discs 22 and 24. It is also indicated generally in Fig. 1. This device is for purposes of illustration only and the invention is intended to cover any similar mechanism which might be used for the controlled rotation of the discs. Numeral 40 refers to the shaft for driving discs 22 and 24 through chains 39. A sprocket wheel 63, adapted to be used in combination with a chain, is fixed to one-half of a clutch 65 whose other half is fixed to a sprocket wheel 64, driven by an electric motor through another chain. The clutch 65 is operated by means of a lever 66 which keeps it in an engaged position, as shown in Fig. 4, against the disengaging action of compression spring 67 contained in two telescoping members 67a and 67b. Outer member 67a is connected to lever 66 while inner member 67b is connected through 69 to some part of the frame, e.g., ring 18. Outer telescopic tube 67a has fixed stops 70 by means of which a locking mechanism to be described later will hold outer tube 67a in position against the action of the spring 67. Lever 66 conveniently straddles shaft 40.

When this mechanism releases outer tube 67a, lever 66 is thrown back into a position indicated by broken lines 72, Fig. 5. In the position indicated by broken lines 72, clutch 65 is disengaged, the discs 22 and 24 are stopped and a shaft 77 is moved longitudinally to the position indicated in Fig. 4 by the dotted lines at 73. There it contacts a movable stop 74 (adjustable by screw 75) of an electric switch 76 and thereby opens a circuit deenergizing the propelling motor. This results in the rotation of shaft 40 being arrested and with it the rotation of discs 22 and 24.

As seen both in Figs. 4 and 5 a latch member 79 pivotally mounted on post 80 and provided with a hand lever 81 is operable to lock in a position indicated in Fig. 5. In this position latch 79 cooperates with pin 82 of lever 66 to maintain the lever in the position indicated by the full lines. In this position clutch 65 is held in disengaged position, while motor 37 is still energized.

Fig. 6 is a detailed top plan view showing how the lugs 84 of two symmetrical levers 85 will retain the fixed stops 70 of outer telescopic tube 68 against the action of spring 67. The stop mechanism may also be seen in Fig. 4. Spring 67 within tubes 68 and 69 acts in the direction of arrow 86 (Fig. 6). These levers 85 have intermeshing gear teeth segments at 87 and are rotatably pivoted on pins 88. Pivot pins 88 of levers 85 are fixed to the frame of the machine. A tension spring 89 tends to make levers 85 and lugs 84 move towards each other, lugs 84 holding stops 70 and thus retaining telescopic tube 68 in its position of clutch engagement through lever 66.

Also shown in Fig. 6 are the ring 18, disc 22 and one of the guide rollers 23 fixed to said disc. Set screw 90 is operatively arranged to strike one of the levers 85, causing both levers to rock against the action of restraining spring 89. Set screw 90 is affixed to disc 22 by means of a bracket 91 held in place by nut 92.

The operation of the stop mechanism is as follows: Set screw 90, attached to disc 22 by means of bracket 91, rotates with the disc until set screw 90 contacts one of levers 85. When the lever is engaged, it is moved in the direction of arrow 93 against the action of spring 89, as is its symmetrical counterpart, due to the meshing of gear teeth 87. This separates lugs 84 and results in the release of stop members 70. When stop members 70 are released, outer tube 68 is forced to slide over inner tube 69 by the pressure of spring 67 in the direction of arrow 71, Fig. 4. This carries lever 66 with it. Further movement of 66 and shaft 77 causes movable stop 74 of electric switch 76 to be contacted, opening a prearranged circuit, stopping the motor and limiting the rotation of discs 22 and 24. Set screw 90 will ordinarily be clamped in position so that it will contact one of the levers 85 when the discs have rotated so that grinding wheel 32 has ground weld seam 33 from the entire surface of rail head 34. The stop mechanism described above is illustrated as providing a means for stopping disc rotation in one direction only. However, a duplicate stop mechanism may be provided so that when disc 22 reaches the other extremity of its rotation, that rotation may likewise be arrested.

Applicant's invention, of which the above is a full and complete disclosure, represents a major advance in the art of grinding rail heads. It provides a mechanism in which the carriage supporting the grinding wheel need only be arranged so that the grinding wheel is in contact with the rail head seam, and mechanical means may be set in motion which will cause the apparatus to grind the entire weld seam portion of the rail head, stopping automatically when either side of the rail head contour has been reached. Automatic guiding means direct the grinding wheel so that only the proper amount of weld seam is removed; only enough to bring the welded portion of the rail head flush with the surface of the remainder of the rail head. Thus smooth, comfortable railroad travel is assured.

It will be readily apparent that substitutions of parts might be made in the above disclosure, or that the location of various parts might be changed without departing from the spirit of the invention. For instance, the control mechanism operated by lever 66 need not be located as seen in Fig. 1, but might be elevated to a position more easily accessible to an operator of the device. Therefore the above-described embodiment is merely illustrative of the invention for the purposes of this description and the invention is limited only by the scope of the appended claims.

I claim:

1. A rail head grinding assembly including in combination means for supporting a rail in a position elevated above the main terrain, a pair of spaced rings, supports rotatably mounted by each ring, guides between said supports and extending substantially parallel to a rail to be ground, a carriage, power-driven grinding means supported by said carriage, means connected to said carriage engaging said guides to support and confine the movements of said carriage, means for rotating said rings and means for reciprocating said carriage along said guides.

2. In a rail head grinding assembly as defined in claim 1, the guide-engaging means of said carriage including pairs of rollers extending at angles with respect to each other to contact different faces of said guides.

3. A rail head grinding mechanism including in combination a motor-driven grinder, a carriage for mounting the same, a pair of annular supporting assemblies, spaced from each other, through which a rail to be ground is extensible, said assemblies each including fixed and rotatable parts, a guide member connected to extend between the rotatable parts of said assemblies and to turn therewith, means connected to said carriage to engage said guide member and thus control the carriage movements, means for shifting said carriage longitudinally of said guide member and means for turning the rotatable parts of said assemblies.

4. In a mechanism as defined in claim 3, pedestals disposed adjacent said assemblies, rail supports carried by said pedestals to maintain a rail above the surface upon which said mechanism is disposed and said assemblies completely encircling a rail mounted by said supports.

5. In a mechanism as defined in claim 3, a roller mounted by said carriage to engage a rail extending through said assemblies and resilient means interposed between said roller and the means connected to said carriage to engage said guide member to thus yieldingly support said grinder.

6. In a mechanism as defined in claim 3, the means connected to said carriage to engage said member comprising different elements extending both substantially parallel and transversely to said carriage and said guide member including surfaces engageable by such elements.

7. A rail head grinding machine to be disposed upon rail-supporting terrain, said machine including in combination a pair of spaced supports between which a rail is disposable to extend in a substantially horizontal plane, a mounting interposed between and connected to said supports to lie in a substantially horizontal plane and elevated above the supporting terrain, a rail-grinding wheel, a carriage supporting the latter to have its side face engage a rail, said carriage being disposed upon said mounting to move along the same in a substantially horizontal path, means for rotating said support to swing said wheel around an axis defined by a rail extending between said supports and means for driving said wheel.

8. A rail head grinding machine to be disposed upon rail-supporting terrain, said machine including in combination a pair of spaced supports between which a rail is disposable to extend in a substantially horizontal plane, a mounting interposed between and connected to said supports to lie in a substantially horizontal plane and elevated above the supporting terrain, a rail-grinding wheel, a carriage supporting the latter to have its side face engage a rail, said carriage being disposed upon said mounting to move along the same in a substantially horizontal path, said supports comprising relatively fixed units and members rotatable in substantially vertical planes and carrying between them said mounting, and power-driven means for rotating said members.

References Cited in the file of this patent

UNITED STATES PATENTS

| | | |
|---|---|---|
| 871,522 | Peirce | Nov. 19, 1907 |
| 1,161,653 | Gherky | Nov. 23, 1915 |
| 1,281,001 | Hazel | Oct. 8, 1918 |
| 1,293,614 | Meitz | Feb. 4, 1919 |
| 1,680,300 | Mallory | Aug. 14, 1928 |
| 1,728,653 | Baumberger | Sept. 17, 1929 |
| 1,754,139 | Asbridge | Apr. 8, 1930 |
| 1,756,908 | Baumberger | Apr. 29, 1930 |
| 2,076,089 | Moore | Apr. 6, 1937 |
| 2,113,276 | Moore | Apr. 5, 1938 |
| 2,130,627 | Kelley | Sept. 20, 1938 |
| 2,163,908 | Hobson | June 27, 1939 |
| 2,539,107 | Sectish | Jan. 23, 1951 |

FOREIGN PATENTS

| | | |
|---|---|---|
| 15,835 | Great Britain | July 17, 1903 |
| 343,881 | France | Aug. 19, 1904 |
| 497,334 | Germany | May 6, 1930 |
| 610,866 | Germany | Mar. 18, 1935 |